(12) United States Patent
Nomaru et al.

(10) Patent No.: US 11,224,941 B2
(45) Date of Patent: Jan. 18, 2022

(54) LASER PROCESSING APPARATUS

(71) Applicant: DISCO CORPORATION, Tokyo (JP)

(72) Inventors: Keiji Nomaru, Tokyo (JP); Yuji Hadano, Tokyo (JP); Masatoshi Nayuki, Tokyo (JP)

(73) Assignee: DISCO CORPORATION, Tokyo (JP)

(*) Notice: Subject to any disclaimer, the term of this patent is extended or adjusted under 35 U.S.C. 154(b) by 556 days.

(21) Appl. No.: 16/168,300

(22) Filed: Oct. 23, 2018

(65) Prior Publication Data
US 2019/0118292 A1    Apr. 25, 2019

(30) Foreign Application Priority Data

Oct. 25, 2017   (JP) .............................. JP2017-206117

(51) Int. Cl.
| | | |
|---|---|---|
| B23K 26/146 | (2014.01) | |
| B23K 26/064 | (2014.01) | |
| B23K 26/14 | (2014.01) | |
| B23K 26/352 | (2014.01) | |
| B23K 26/08 | (2014.01) | |
| B23K 26/40 | (2014.01) | |

(52) U.S. Cl.
CPC .......... B23K 26/146 (2015.10); B23K 26/064 (2015.10); B23K 26/0853 (2013.01); B23K 26/0869 (2013.01); B23K 26/1462 (2015.10); B23K 26/352 (2015.10); B23K 26/40 (2013.01)

(58) Field of Classification Search
CPC ................ B23K 26/146; B23K 26/064; B23K 26/1462; B23K 26/352; B23K 26/0853; B23K 26/0869; B23K 26/40

USPC .............. 219/121.6, 121.67, 121.84, 121.86
See application file for complete search history.

(56) References Cited

U.S. PATENT DOCUMENTS

| | | | | |
|---|---|---|---|---|
| 2002/0050489 A1* | 5/2002 | Ikegami | ............... | B23K 26/082 219/121.69 |
| 2002/0136971 A1* | 9/2002 | Ito | ........................... | B23K 26/04 430/22 |
| 2005/0003737 A1* | 1/2005 | Montierth | ............... | A61B 8/546 451/5 |

(Continued)

FOREIGN PATENT DOCUMENTS

| | | |
|---|---|---|
| JP | 10305420 A | 11/1998 |
| JP | 2002192370 A | 7/2002 |

(Continued)

*Primary Examiner* — Tu B Hoang
*Assistant Examiner* — Alba T Rosario-Aponte
(74) *Attorney, Agent, or Firm* — Greer Burns & Crain Ltd.

(57) ABSTRACT

A liquid supply mechanism disposed at an upper portion of a holding unit includes a liquid chamber having a transparent plate positioned to form a gap between itself and an upper surface of a workpiece held on a holding table, a roller formed of a transparent member that is disposed in a non-contact state at a position proximate to an upper surface of the workpiece held on the holding table inside the liquid chamber and that produces a flow of a liquid on the workpiece; a motor rotating the roller, a liquid supply nozzle supplying the liquid into the gap from one side of the liquid chamber, and a liquid discharge nozzle discharging the liquid from the other side of the liquid chamber. A laser beam is applied to the workpiece through the transparent plate, the roller, and the liquid supplied into the gap.

7 Claims, 6 Drawing Sheets

(56) References Cited

U.S. PATENT DOCUMENTS

| | | | | |
|---|---|---|---|---|
| 2006/0086459 A1* | 4/2006 | Koga | ................... | B23K 26/40 |
| | | | | 156/345.19 |
| 2008/0213978 A1* | 9/2008 | Henry | .................. | B08B 7/0092 |
| | | | | 438/462 |
| 2017/0371279 A1* | 12/2017 | Imoto | ............... | G03G 15/2007 |
| 2019/0126397 A1* | 5/2019 | Nomaru | ............. | H01L 21/6715 |

FOREIGN PATENT DOCUMENTS

| | | |
|---|---|---|
| JP | 2004188475 A | 7/2004 |
| JP | 2014221483 A | 11/2014 |

\* cited by examiner

LASER PROCESSING APPARATUS

BACKGROUND OF THE INVENTION

Field of the Invention

The present invention relates to a laser processing apparatus applying a laser beam to a plate-shaped workpiece to process the workpiece.

Description of the Related Art

A wafer having a plurality of devices such as integrated circuits (ICs) and large-scale integrations (LSIs) formed in a front surface of the wafer demarcated by division lines (streets) and is divided into individual device chips by a laser processing apparatus, and the divided device chips are used for electric equipment such as a mobile phone, a personal computer, and illumination equipment.

Examples of the laser processing apparatus include the following types: a laser processing apparatus adopting ablation processing through which a laser beam of such a wavelength as to be absorbed in a workpiece is applied to the workpiece, with a focal point of the laser beam positioned on a front surface of the workpiece, thereby forming grooves serving as starting points of division (see, for example, Japanese Patent Laid-open No. Hei 10-305420); a laser processing apparatus in which a laser beam of such a wavelength as to be transmitted through a workpiece is applied to the workpiece, with a focal point of the laser beam positioned inside the workpiece, thereby forming modified layers serving as starting points of division inside the workpiece (see, for example, Japanese Patent No. 3408805); and a laser processing apparatus in which a laser beam of such a wavelength as to be transmitted through a workpiece is applied to the workpiece, with a focal point of the laser beam positioned inside the workpiece, thereby forming a plurality of shield tunnels each including a fine hole extending from a front surface to a back surface of the workpiece and serving as a starting point of division and an amorphous region surrounding the fine hole (see, for example, Japanese Patent Laid-open No. 2014-221483). One of these types of the laser processing apparatuses is appropriately selected according to a kind of a workpiece, processing accuracy to be required, and the like factors.

Of the above-mentioned laser processing apparatuses, particularly that of performing ablation processing has a problem that debris (laser processing swarf) generated upon application of the laser beam to the front surface of the wafer may scatter and adhere to the front surfaces of the devices formed on the wafer, thereby lowering the quality of the devices. To overcome this problem, there has been proposed a technique in which a liquid resin through which the laser beam used for processing is transmitted is applied to the front surface of the wafer before performing the laser processing, to thereby prevent adhesion of debris, and the liquid resin is removed after performing the laser processing (see, for example, Japanese Patent Laid-open No. 2004-188475).

SUMMARY OF THE INVENTION

According to the technique described in Japanese Patent Laid-open No. 2004-188475, the coating with the liquid resin makes it possible to prevent debris from adhering to the front surfaces of the devices, whereby processing quality is secured. However, this technique needs a step of applying the liquid resin and a step of removing the liquid resin after the processing, causing a problem in productivity. Further, since the liquid resin cannot be utilized repeatedly, using the liquid resin is uneconomical.

There has also been proposed a technique in which application of a laser beam is conducted with a wafer immersed in water, to cause debris to float in water, whereby adhesion of the debris to the front surface of the wafer is prevented. In a case where the laser beam is applied to the wafer with the wafer immersed in water, however, minute bubbles are generated from the part of the wafer to which the laser beam is applied, leading to a problem that propagation of the laser beam is obstructed by the bubbles, and desired processing cannot be achieved.

It is therefore an object of the present invention to provide a laser processing apparatus by which a laser beam can be applied to a plate-shaped workpiece to process the workpiece, while preventing the application of the laser beam to the workpiece from being obstructed.

In accordance with an aspect of the present invention, there is provided a laser processing apparatus including a holding unit having a holding table holding a plate-shaped workpiece, a laser beam applying unit applying a laser beam to the workpiece held on the holding table to process the workpiece, and a liquid supply mechanism disposed at an upper portion of the holding unit. The liquid supply mechanism includes a liquid chamber having a transparent plate positioned to form a gap between itself and an upper surface of the workpiece held on the holding table, a roller formed of a transparent member that is disposed in a non-contact state at a position proximate to the upper surface of the workpiece held on the holding table inside the liquid chamber and that produces a flow of a liquid on the workpiece, a roller rotating mechanism rotating the roller, a liquid supply nozzle supplying the liquid into the gap from one side of the liquid chamber, and a liquid discharge nozzle discharging the liquid from the other side of the liquid chamber. The laser beam applying unit includes a laser oscillator emitting a laser beam, and a condenser condensing the laser beam emitted from the laser oscillator to apply the laser beam to the workpiece held on the holding table through the transparent plate, the roller, and the liquid supplied into the gap.

Preferably, the laser beam applying unit further includes dispersing means dispersing the laser beam emitted from the laser oscillator.

According to the present invention, a laser processing apparatus is provided in which application of a laser beam to a workpiece is not obstructed. In addition, in a case where the present invention is applied to a laser processing apparatus performing ablation processing, adhesion of debris generated at the time of laser processing to devices can be restrained, and processing quality of the devices is prevented from being lowered, without coating the front surface of the wafer with a liquid resin.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
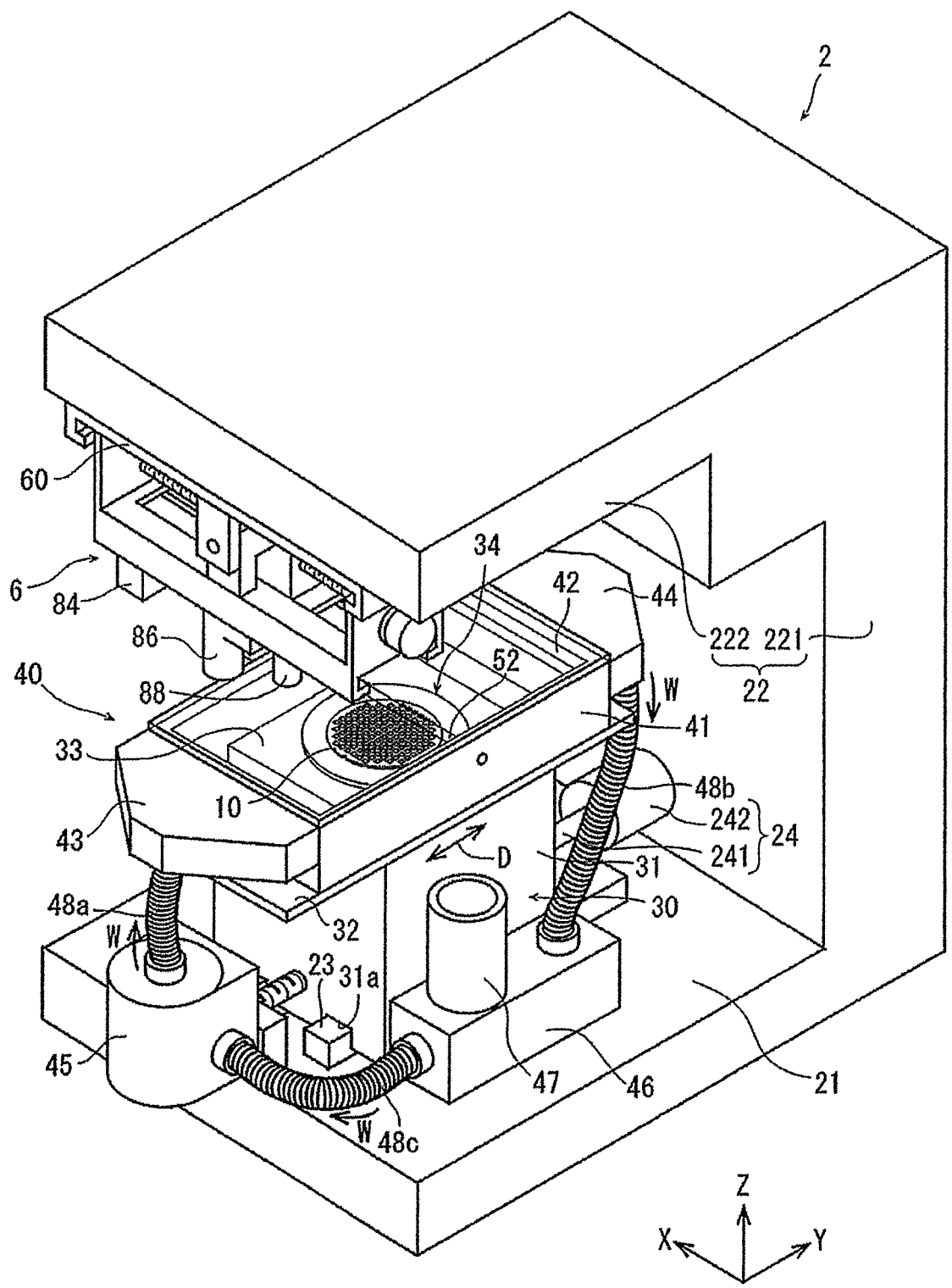
FIG. 1 is a perspective view of a laser processing apparatus according to an embodiment of the present invention.

A laser processing apparatus according to an embodiment of the present invention will be described more in detail below, referring to the attached drawings. FIG. 1 illustrates a perspective view of a laser processing apparatus 2 in the present embodiment. The laser processing apparatus 2 includes a base 21, a holding unit 30 disposed on the base 21 and holding a workpiece, a frame body 22 including a vertical wall section 221 erected in a Z-direction indicated by an arrow Z on a lateral side of the holding unit 30 on the base 21, and a horizontal wall section 222 extending in a horizontal direction from an upper end portion of the vertical wall section 221, a liquid supply mechanism 40 disposed at an upper portion of the holding unit 30, and a laser beam applying unit 6 disposed on a lower surface of the horizontal wall section 222.

Figure 2:
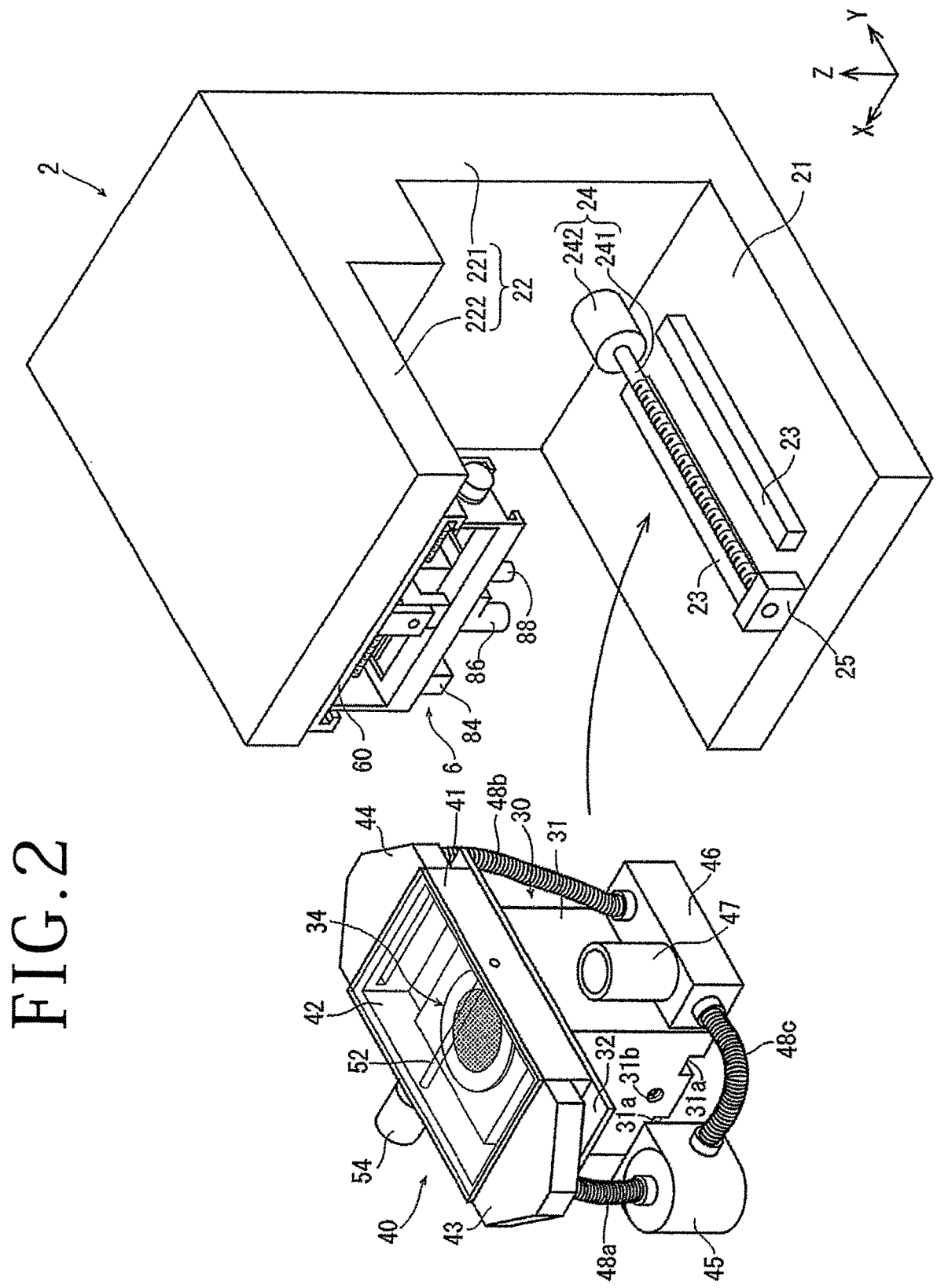
FIG. 2 is a perspective view illustrating a liquid supply mechanism and a holding unit of the laser processing apparatus illustrated in FIG. 1, in a dismantled state.
Figure 3:
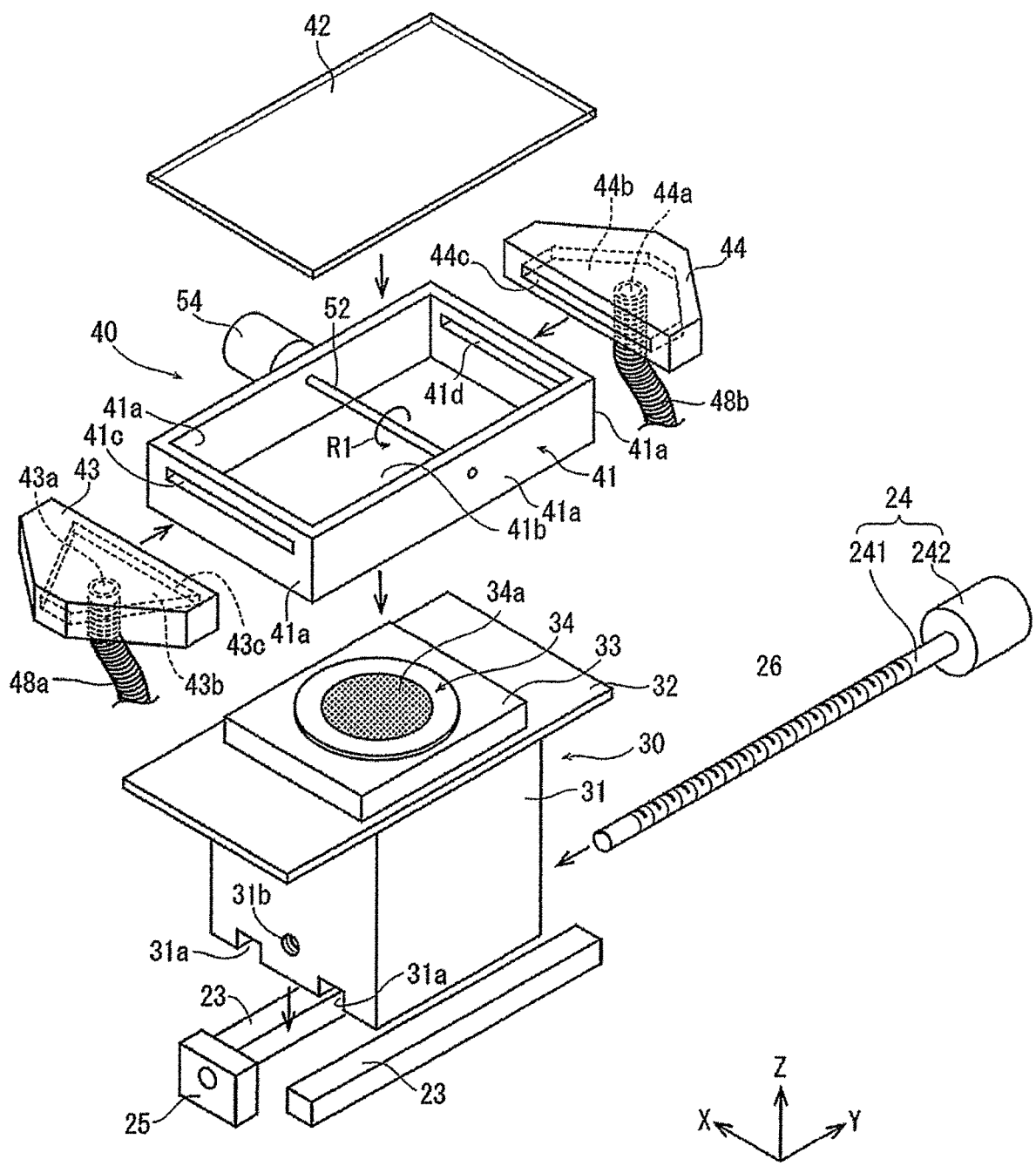
FIG. 3 is a perspective view illustrating the liquid supply mechanism and the holding unit illustrated in FIG. 2, in a partly dismantled state.

FIG. 2 is a perspective view illustrating the liquid supply mechanism 40 and the holding unit 30 of the laser processing apparatus 2 in a dismantled state. In addition, FIG. 3 is a perspective view illustrating each of components of the holding unit 30 as well as a liquid chamber 41, a liquid supply nozzle 43 and a liquid discharge nozzle 44 which constitute the liquid supply mechanism 40, in a dismantled state. Each of the components will be described below.

As illustrated in FIG. 3, the holding unit 30 includes a holding base 31 having a rectangular parallelepiped shape, a rectangular base table 32 disposed on an upper surface of the holding base 31, a central table 33 disposed substantially in the center of the base table 32 and configured to be substantially one-half in area of the base table 32, and a circular holding table 34 disposed on the central table 33. The holding table 34 is configured to be rotatable by a rotating mechanism (not illustrated). A central region of the holding table 34 is composed of a circular suction chuck 34a formed from a gas-permeable material, for example, a porous ceramic. The suction chuck 34a is connected to a suction source (not illustrated), and holds under suction, a plate-shaped workpiece placed on the suction chuck 34a.

The liquid supply mechanism 40 is disposed at the upper portion of the holding unit 30. On the base table 32 disposed on the holding base 31 of the holding unit 30, a liquid chamber 41 is placed so as to be slidable in a Y-axis direction. The liquid chamber 41 includes a frame 41a extending in an X-axis direction and the Y-axis direction, a transparent plate 42 closing from above a space 41b defined by the frame 41a, and a roller 52 producing a flow of a liquid supplied into the space 41b. This configuration ensures that the space 41b can be a space closed by the base table 32, the transparent plate 42, and the frame 41a. The frame 41a has end portions positioned so as to face each other in the Y-axis direction. One end portion of the frame 41a is provided with a liquid supply port 41c providing communication between the space 41b and the exterior, and the other end portion of the frame 41a is provided with a liquid discharge port 41d providing communication between the space 41b and the exterior. The liquid supply port 41c and the liquid discharge port 41d extend in a horizontal direction in the above-mentioned end portions of the frame 41a, and are formed in a size greater than a diameter of the suction chuck 34a. The transparent plate 42 is configured to be detachable, to open an upper side of the liquid chamber 41, at the time of placing the workpiece onto the holding table 34 or taking out the workpiece from the holding table 34. The transparent plate 42 is composed of, for example, a glass plate.

A liquid supply nozzle 43 is connected to a position of the frame 41a at which the liquid supply port 41c is disposed. In addition, a liquid discharge nozzle 44 for discharging the liquid is connected to a position of the frame 41a at which the liquid discharge port 41d is disposed. With this configuration, the liquid is supplied from one side of the liquid chamber 41 by the liquid supply nozzle 43, and the liquid is discharged from the other side of the liquid chamber 41 by the liquid discharge nozzle 44. This will be described more specifically below.

The liquid supply nozzle 43 is provided with a supply port 43a supplied with the liquid, a passage 43b through which the liquid supplied from the supply port 43a passes, and a discharge port 43c through which the liquid having passed through the passage 43b is discharged. As indicated by dotted lines in the figure, the supply port 43a is disposed in a lower surface of the liquid supply nozzle 43, the passage 43b is formed inside the liquid supply nozzle 43, and the discharge port 43c is formed in the same shape as the liquid supply port 41c at a position of facing the liquid supply port 41c of the liquid chamber 41. With the liquid supply nozzle 43 connected to the liquid chamber 41, the discharge port 43c of the liquid supply nozzle 43 and the liquid supply port 41c of the liquid chamber 41 are mated to each other, and the supply port 43a of the liquid supply nozzle 43 and the space 41b inside the liquid chamber 41 communicate with each other.

The liquid discharge nozzle 44 is configured in the same shape as the liquid supply nozzle 43. The liquid discharge nozzle 44 is provided with a supply port 44c supplied with the liquid, a passage 44b through which the liquid supplied from the supply port 44c passes, and a discharge port 44a through which the liquid having passed through the passage 44b is discharged. As illustrated in FIG. 3, the supply port 44c of the liquid discharge nozzle 44 is formed in the same shape as the liquid discharge port 41d of the liquid chamber 41 at a position of facing the liquid discharge port 41d of the liquid chamber 41. The passage 44b is formed inside the liquid discharge nozzle 44, and the discharge port 44a is disposed in a lower surface of the liquid discharge nozzle 44. With the liquid supply nozzle 43 and the liquid discharge nozzle 44 connected to the liquid chamber 41, the supply port 43a of the liquid supply nozzle 43 and the discharge port 44a of the liquid discharge nozzle 44 communicate with each other through the space 41b inside the liquid chamber 41.

As illustrated in FIG. 3, the roller 52 is a rod-shaped member of 5.0 mm in diameter which crosses the space 41b inside the liquid chamber 41 in the X-axis direction, and is formed of a transparent member through which the laser beam is transmitted, for example, a glass. One end portion of the roller 52 is rotatably supported substantially at the center of a portion of the frame 41a which is disposed along the Y-axis direction, and the other end portion of the roller 52 is rotatably supported substantially at a central position of a portion of the frame 41a which faces the above-mentioned portion of the frame 41a supporting the one end portion of the roller 52. A motor 54 as a roller rotating mechanism rotating the roller 52 in a direction indicated by an arrow R1 is connected to the other end portion of the roller 52. The motor 54 is fixed to the frame 41a, and when the motor 54 rotates, the roller 52 is rotated in the direction of the arrow R1.

As illustrated in FIG. 2, a pair of guide rails 23 and 23 extending in the Y-axis direction and holding table moving means 24 moving the holding base 31 in the Y-axis direction along the guide rails 23 and 23 are disposed on an upper surface of the base 21. A lower surface of the holding base 31 is provided with a pair of guided grooves 31a and 31a respectively fitted to the guide rails 23 and 23. With the guided grooves 31a and 31a respectively fitted to the guide rails 23 and 23, the holding base 31 can be moved in the Y-axis direction along the guide rails 23 and 23.

The holding table moving means 24 includes a male screw rod 241 disposed in parallel to and between the pair of guide rails 23 and 23, and a pulse motor 242 fixed on the base 21 to rotationally drive the male screw rod 241. The male screw rod 241 has its one end rotatably supported by a bearing block 25 fixed on the base 21, and has its other end connected to an output shaft of the pulse motor 242. In addition, the male screw rod 241 is screwed into a penetrating female screw hole 31b formed in a lower central portion of the holding base 31 along the Y-axis direction (see FIG. 3 also). With the male screw rod 241 driven to rotate forward and reversely by the pulse motor 242, the holding base 31 is moved in the Y-axis direction along the guide rails 23 and 23. Note that, while illustration is omitted, the holding table moving means 24 is provided with position detecting means, whereby a position of the holding base 31 in the Y-axis direction is detected accurately. Based on the position information, a driving signal for the pulse motor 242 is produced in control means (omitted in illustration) of the laser processing apparatus 2, and the driving signal is output to the pulse motor 242, whereby the holding table 34 disposed on the upper surface of the holding base 31 can be accurately positioned at a desired position.

While illustration of a specific fixing method is omitted for convenience of explanation, the liquid supply mechanism 40 is fixed relative to the base 21. Specifically, when the holding base 31 is moved in the Y-axis direction, as mentioned above, the liquid supply mechanism 40 disposed at an upper portion of the holding base 31 is not moved. Therefore, with the holding base 31 moved, the workpiece held on the holding table 34 is moved in the Y-axis direction on the base 21, and is moved in the Y-axis direction also in relation to the liquid supply mechanism 40. Note that the liquid supply mechanism 40 need only be disposed so as not to be moved relative to the base 21, and may be fixed to the horizontal wall section 222 by brackets or the like.

The base table 32 disposed on the holding base 31 is formed to be longer in size in the Y-axis direction than the frame 41a constituting the liquid chamber 41. As a result, even when the holding base 31 is moved beneath the liquid chamber 41 in the Y-axis direction, a state in which the lower side of the space 41b of the liquid chamber 41 is closed is maintained by the base table 32. Note that at least one of a lower surface of the liquid chamber 41 and an upper surface of the base table 32 is provided with a fluorine coating, whereby maintaining of a hermetically sealed state of the space 41b inside the liquid chamber 41 and smooth movement of the holding base 31 are secured.

Configurations of the liquid supply mechanism 40 and the surroundings thereof will be described. As illustrated in FIG. 2, the laser processing apparatus 2 according to the present embodiment includes a liquid supply pump 45, a filter 46, and a liquid reserving tank 47, in such a manner that the liquid is constantly supplied inside the liquid supply mechanism 40. The liquid reserving tank 47 is disposed at the filter 46. The liquid supply pump 45 and the liquid supply nozzle 43 are connected together by a first hose 48a, the liquid discharge nozzle 44 and the filter 46 are connected together by a second hose 48b, and the filter 46 and the liquid supply pump 45 are connected together by a third hose 48c. The hoses 48a to 48c are composed of resin-made flexible hoses.

According to the above-mentioned configuration, as illustrated in FIG. 1, the liquid W discharged from the liquid supply pump 45 is supplied to the liquid chamber 41 through the first hose 48a and the liquid supply nozzle 43, and the liquid W supplied to the liquid chamber 41 is discharged through the liquid discharge nozzle 44. Then, the liquid W discharged from the liquid discharge nozzle 44 is led to the filter 46 to be filtered there and then returned to the liquid supply pump 45. In the liquid supply mechanism 40 in the present embodiment, it is allowable that the liquid W gradually leaks through a gap between the liquid chamber 41 and the base table 32, a gap between the frame 41a and the transparent plate 42, and the like, and the liquid W having leaked may be collected on the base 21 and be recirculated to the filter 46. In addition, in a case where an amount of the liquid W decreases due to the leakage, the liquid W may be appropriately supplemented from the liquid reserving tank 47. Note that the liquid reserving tank 47 is connected directly to the filter 46, and also has a function of discharging air bubbles contained in the liquid W led to the filter 46.

According to the configuration as above, the liquid W is circulated in the liquid supply mechanism 40, the liquid supply pump 45, the filter 46, and the liquid reserving tank 47. A flow rate of the liquid W flowing in the liquid chamber 41 can be controlled by regulating a pressure feeding efficiency of the liquid supply pump 45, modifying an internal volume of the liquid chamber 41, or regulating opening areas of the liquid supply port 41c and the liquid discharge port 41d.

Figure 4:
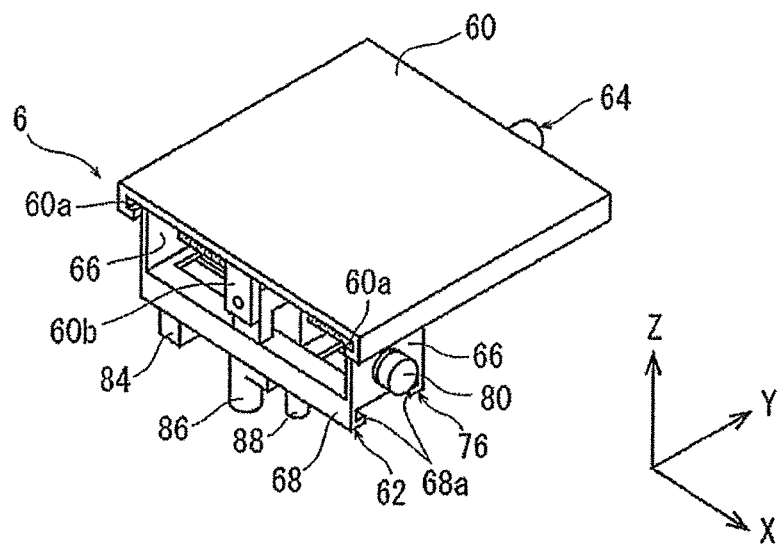
FIG. 4 is a perspective view of a laser beam applying unit of the laser processing apparatus illustrated in FIG. 1.

Now, referring to FIGS. 1, 4 and 5, the laser beam applying unit 6 will be described. Note that FIG. 5 is an exploded perspective view of the laser beam applying unit 6 illustrated in FIG. 4.

The laser beam applying unit 6 includes a guide plate 60 fixed to the lower surface of the horizontal wall section 222 of the frame body 22 by fixing means (not illustrated), a Y-axis direction movable member 62 supported by the guide plate 60 so as to be movable in the Y-axis direction, and a Y-axis direction moving mechanism 64 moving the Y-axis direction movable member 62 in the Y-axis direction. A pair of guide rails 60a extending in the Y-axis direction is formed at a lower portion of either end of the guide plate 60 in the X-axis direction. As illustrated in FIGS. 4 and 5, the Y-axis direction movable member 62 includes a pair of guided sections 66 disposed to be spaced apart from each other in the X-axis direction, and a mounting section 68 arranged between lower ends of the guided sections 66 and extending in the X-axis direction. A guided rail 66a extending in the Y-axis direction is formed at an upper portion of each of the guided sections 66. The guided rails 66a of the guided sections 66 and the guide rails 60a of the guide plate 60 are engaged with each other, whereby the Y-axis direction movable member 62 is supported by the guide plate 60 so as to be movable in the Y-axis direction. Also, a pair of guide rails 68a extending in the X-axis direction is formed at a lower portion of either end of the mounting section 68 in the Y-axis direction. The Y-axis direction moving mechanism 64 includes a ball screw 70 extending in the Y-axis direction under the guide plate 60, and a motor 72 connected to one end portion of the ball screw 70. A gate-shaped nut section 70a of the ball screw 70 is fixed to an upper surface of the mounting section 68. The other end portion of the ball screw 70, to which the motor 72 is not connected, is screwed into the nut section 70a, before being rotatably supported by a support piece section 60b formed at a front edge portion of the guide plate 60. The Y-axis direction moving mechanism 64 converts a rotational motion of the motor 72 into a rectilinear motion, and transmits the rectilinear motion to the Y-axis direction movable member 62, by the ball screw 70, thereby moving the Y-axis direction movable member 62 in the Y-axis direction along the guide rails 60a of the guide plate 60.

Figure 5:
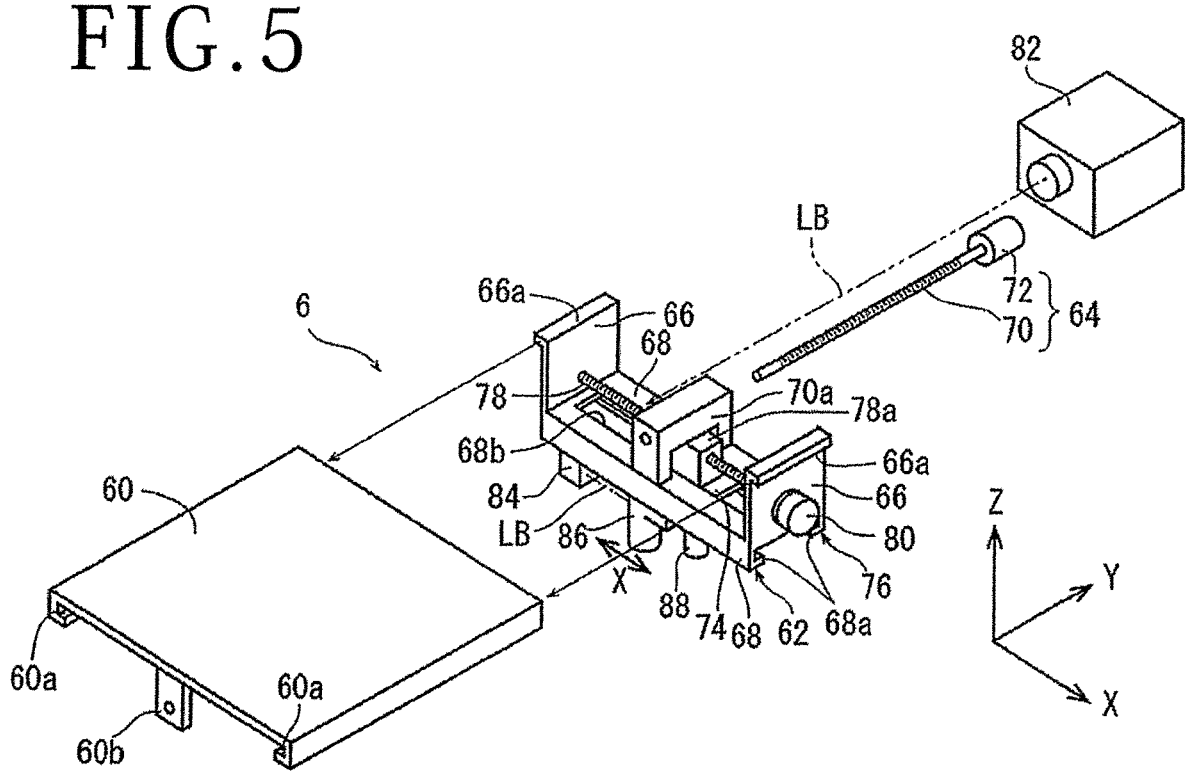
FIG. 5 is an exploded perspective view of the laser beam applying unit illustrated in FIG. 4, in a partly dismantled state.

Referring to FIG. 5, description of the laser beam applying unit 6 will be continued. The laser beam applying unit 6 further includes an X-axis direction movable plate 74 mounted to the mounting section 68 of the Y-axis direction movable member 62 so as to be movable in the X-axis direction, and the X-axis direction moving mechanism 76 moving the X-axis direction movable plate 74 in the X-axis direction. Both end portions of the X-axis direction movable plate 74 in the Y-axis direction and the guide rails 68a of the mounting section 68 are engaged with each other, whereby the X-axis direction movable plate 74 is mounted to the mounting section 68 so as to be movable in the X-axis direction. The X-axis direction moving mechanism 76 includes a ball screw 78 extending in the X-axis direction on the upper side of the mounting section 68, and a motor 80 connected to one end portion of the ball screw 78 and supported by one of the guided sections 66. A nut section 78a of the ball screw 78 is passed through an opening 68b of the mounting section 68 and fixed to an upper surface of the X-axis direction movable plate 74. The other end portion of the ball screw 78, to which the motor 80 is not connected, is rotatably supported by the other one of the guided sections 66 to which the motor 80 is not fixed. The X-axis direction moving mechanism 76 converts a rotational motion of the motor 80 into a rectilinear motion, and transmits the rectilinear motion to the X-axis direction movable plate 74, by the ball screw 78, thereby moving the X-axis direction movable plate 74 in the X-axis direction along the guide rails 68a of the mounting section 68.

Figure 6:
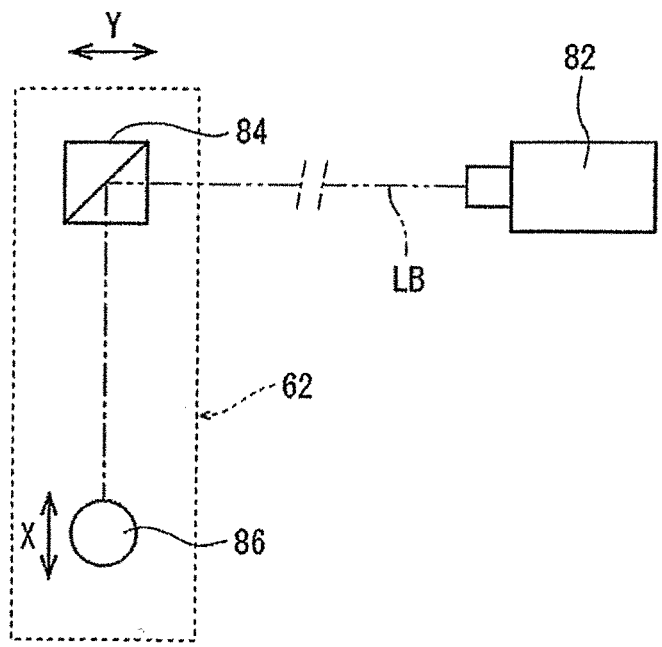
FIG. 6 is a block diagram schematically illustrating an optical system of the laser beam applying unit illustrated in FIG. 4.

Further, referring to FIGS. 5 to 8, a configuration of an optical system of the laser beam applying unit 6 will be described. As illustrated in FIG. 5, the laser beam applying unit 6 includes a laser oscillator 82 emitting a pulsed laser beam LB, an attenuator (omitted in illustration) controlling an output of the laser beam LB emitted from the laser oscillator 82, a right-angle prism mirror 84 mounted to a lower surface of the mounting section 68 of the Y-axis direction movable member 62 to be spaced apart from the laser oscillator 82 in the Y-axis direction, a condenser 86 mounted to a lower surface of the X-axis direction movable plate 74 so as to be movable in the Z-axis direction, and focal point position control means (omitted in illustration) adapted to move the condenser 86 in the Z-axis direction to control the position in the Z-axis direction of the focal point of the condenser 86. The laser oscillator 82 oscillates, for example, a laser such a wavelength (for example, 355 nm) as to be absorbed in the workpiece. As illustrated in FIG. 6, the laser beam LB applied in the Y-axis direction from the laser oscillator 82 has its propagation direction changed by 90 degrees by the right-angle prism mirror 84, to be led to the condenser 86.

Figure 7A:
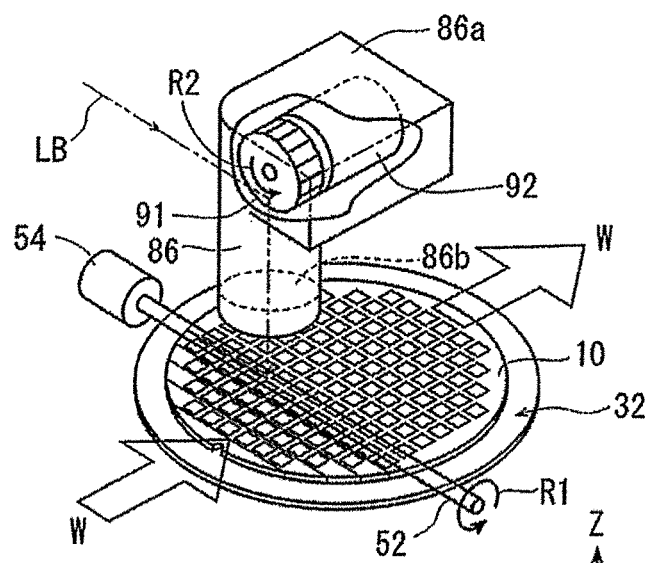
FIG. 7A is a perspective view illustrating a state in which laser processing is performed by the laser beam applying unit illustrated in FIG. 5.
Figure 8:
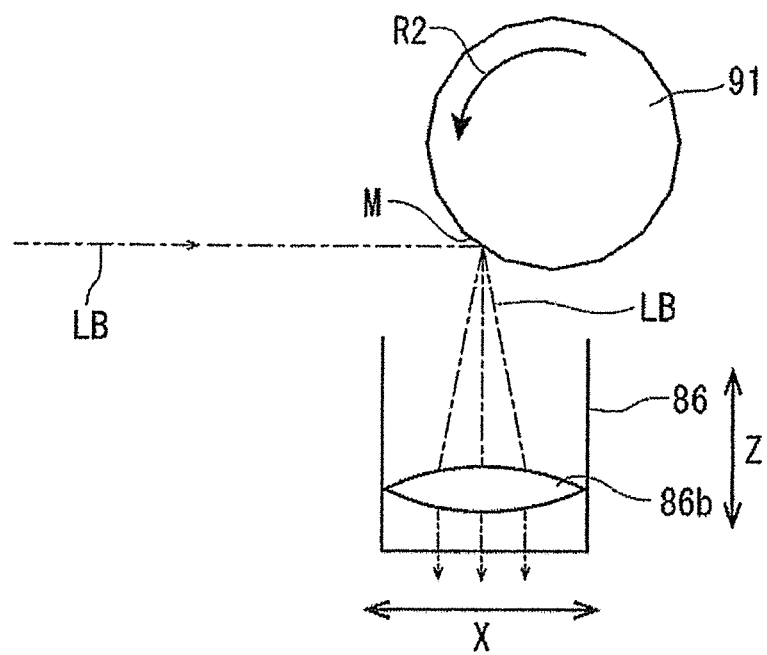
FIG. 8 is a side view of the laser beam applying unit for explaining a state in which laser processing is performed with a laser beam dispersed by dispersing means of the laser beam applying unit illustrated in FIG. 7A.

As illustrated in FIG. 7A, inside an upper housing 86a of the condenser 86, there are provided a polygon mirror 91 as dispersing means dispersing the laser beam LB oscillated by the laser oscillator 82, and a motor 92 rotating the polygon mirror 91 at a high speed in a direction indicated by an arrow R2, and a condensing lens (fθ lens) 86b condensing the laser beam LB to apply the laser beam LB to the workpiece. As illustrated in FIG. 8, the polygon mirror 91 has a plurality of mirrors M arranged concentrically with respect to a rotational axis of the polygon mirror 91. The fθ lens 86b is located under the polygon mirror 91, and focuses the laser beam LB to apply the laser beam LB to the workpiece on the holding table 34. The laser beam LB led from the right-angle prism mirror 84 is led to the fθ lens 86b in such a manner that the irradiation direction of the laser beam LB is dispersed in the X-axis direction by the mirrors M rotated, and the laser beam LB is applied while being dispersed within a predetermined range in the X-axis direction on the workpiece. Note that the transparent plate 42 is omitted in FIG. 7A, for convenience of explanation.

Returning to FIG. 5 for continuing the description, on the lower surface of the X-axis direction movable plate 74, alignment means 88 mounted to be spaced apart from the condenser 86 in the X-axis direction is disposed, together with the condenser 86. The alignment means 88 is configured to image the workpiece held on the holding table 34, to detect a region to be laser processed. Further, the laser beam applying unit 6 includes focal point position control means (not illustrated). While illustration of a specific configuration of the focal point position control means is omitted, the configuration may include, for example, a ball screw having a nut section fixed to the condenser 86 and extending in the Z-axis direction, and a motor connected to one end portion of the ball screw. By such a configuration, a rotational motion of the motor is converted into a rectilinear motion, and the condenser 86 is moved along guide rails (omitted in illustration) disposed in the Z-axis direction, whereby the position in the Z-axis direction of the focal point of the laser beam LB condensed by the condenser 86 is controlled.

The laser processing apparatus 2 of the present invention is generally configured as mentioned above, and an operation thereof will be described below. In performing laser processing by the laser processing apparatus 2 in the present embodiment, first, a plate-shaped workpiece, for example, a wafer 10 formed of silicon (Si) and having devices formed on a front surface thereof is prepared. After the wafer 10 is prepared, the transparent plate 42 illustrated in FIG. 1 is temporarily detached, to open the upper side of the liquid chamber 41, and the wafer 10 is placed on the holding table 34 in a state in which the front surface formed with the devices faces upward. After the wafer 10 is placed on the holding table 34, a suction source (not illustrated) is operated to produce a suction force on the suction chuck 34a of the holding table 34, whereby the wafer 10 is held under suction. After the wafer 10 is held on the suction chuck 34a, the transparent plate 42 is fixed onto the liquid chamber 41 by appropriate fixing means, resulting in a state in which the upper side of the liquid chamber 41 is closed.

After the wafer 10 is held on the holding table 34 and the upper side of the liquid chamber 41 is closed with the transparent plate 42, a sufficient amount of the liquid W is supplemented to the liquid reserving tank 47, and the liquid supply pump 45 is operated. As the liquid W supplied to the liquid supply mechanism 40, pure water may be used, for example.

With the lapse of a predetermined time after the start of an operation of the liquid supply pump 45, the space 41b inside the liquid chamber 41 is filled up with the liquid W, and the liquid W is stably circulated in the liquid supply mechanism 40, the filter 46, and the liquid supply pump 45.

In the state in which the liquid W is stably circulated in the liquid supply mechanism 40, the holding table moving means 24 is operated, and the alignment means 88 is positioned above the wafer 10 by the X-axis direction moving mechanism 76 and the Y-axis direction moving mechanism 64 of the laser beam applying unit 6. Since the transparent plate 42 is disposed such as to entirely cover the holding table 34 from above, the alignment means 88 is able to image the whole region including the devices on the wafer 10. After the alignment means 88 is positioned above the wafer 10, the wafer 10 is imaged by the alignment means 88. In this instance, the wafer 10 is imaged through the transparent plate 42 and the liquid W. Next, based on the image of the wafer 10 imaged by the alignment means 88, alignment between the wafer 10 and the condenser 86 is conducted. After the alignment, the holding table 34 is rotated, the X-axis direction movable plate 74 is moved by the X-axis direction moving mechanism 76, and the Y-axis direction movable member 62 is moved by the Y-axis direction moving mechanism 64, whereby a predetermined one of the division lines formed in a grid pattern on the wafer 10 is positioned along the X-axis direction, and the condenser 86 is positioned at one end portion of the predetermined division line, namely, a starting position for irradiation of the laser beam.

Figure 7B:
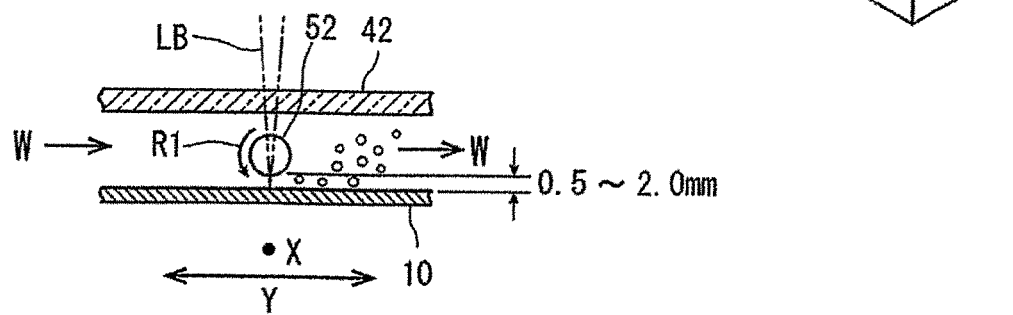
FIG. 7B is a side view of FIG. 7A.

FIG. 7A is a perspective view illustrating a state in which laser processing is performed by the laser beam applying unit 6, and FIG. 7B is a side view of the state of laser processing illustrated in FIG. 7A. In the laser processing apparatus 2 in the present embodiment, the roller 52 is disposed in a gap formed between the transparent plate 42 closing the upper side of the liquid chamber 41, and the wafer 10. The roller 52 is positioned in a non-contact state at a position proximate to an upper surface of the wafer 10 serving as the workpiece, for example, at such a position that a distance from the front surface of the wafer 10 to a lower surface of the roller 52 is 0.5 to 2.0 mm. Besides, as illustrated in FIG. 7B, the condenser 86 is set into such a state that the laser beam LB applied from the condenser 86 is always transmitted through the center of the roller 52, namely, that the position in the Y-axis direction to which the laser beam LB is applied coincides with the position at which the roller 52 is disposed. Next, the condenser 86 is moved in the Z-axis direction by the focal point position control means (not illustrated), to position the focal point at a front surface level of the one end portion of the division line on the wafer 10. After the focal point position of the laser beam LB to be applied from the condenser 86 is positioned on the wafer 10, the motor 54 is operated to rotate the roller 52 in a direction indicated by the arrow R1. As a result, a flow of the liquid W in a direction from the liquid supply nozzle 43 toward the liquid discharge nozzle 44 in the Y-axis direction, between the roller 52 and the front surface of the wafer 10, is accelerated, so that a faster flow is generated.

After the focal point position is positioned at the level of the front surface of the wafer 10 while rotating the roller 52 as above-mentioned, the condenser 86 is moved at a predetermined moving speed in the X-axis direction while operating the laser beam applying unit 6 to apply the laser beam LB. In performing laser processing by applying the laser beam LB to the wafer 10, the polygon mirror 91 is rotated at an appropriate rotating speed by the motor 92, as has been described based on FIGS. 7A to 8. With the positions of the mirrors M constituting the polygon mirror 91 varied attendant on the rotation of the polygon mirror 91, the laser beam LB is applied while being dispersed in the X-axis direction of the wafer 10. As is seen from FIGS. 7A and 7B, the direction in which the laser beam LB is dispersed is the X-axis direction, and therefore, the laser beam LB is dispersed along the roller 52. After the laser beam LB is applied to a predetermined mirror M, the laser beam LB is applied to the mirror M on the downstream side with respect to the rotating direction R2 of the polygon mirror 91, whereby the laser beam LB is continuedly and dispersedly applied to the wafer 10. While the laser beam LB is emitted from the laser oscillator 82 and the polygon mirror 91 is rotated, such laser processing is repeated. Note that the number of sheets of the mirrors M constituting the polygon mirror 91, the rotational speed of the polygon mirror 91, and the like factors are appropriately determined according to the workpiece.

The laser processing by the laser processing apparatus 2 described above may be carried out, for example, in the following processing conditions.

Wavelength of laser beam: 226 nm, 355 nm, 532 nm, 1,064 nm

Average output: 10 to 100 W

Repetition frequency: 0 to 300 MHz

Pulse width: 50 fs to 1 ns

Processing feeding speed: 10 to 1,000 mm/s

In the present embodiment, the liquid chamber 41 of the liquid supply mechanism 40 is positioned at an upper portion of the holding table 34, and as illustrated in FIG. 7B, the operation of the rotating roller 52 produces a flow of the liquid W in the Y-axis direction orthogonal to the processing feeding direction (X-axis direction). In this state, the laser beam LB is applied to the division line on the wafer 10 through the transparent plate 42, the roller 52 and the liquid W, whereby ablation is performed. When the ablation is applied to the front surface of the wafer W, air bubbles B are generated in the liquid W located at the position to which the laser beam LB is applied. In the present embodiment, as illustrated in FIG. 7B, a flow velocity is produced by rotation of the roller 52 in the liquid W supplied onto the wafer 10, and the air bubbles B generated in the vicinity of the application position of the laser beam LB are swiftly flowed away to the downstream side of the liquid chamber 41 to be removed. As a result, in the case of applying the laser beam LB to the wafer 10 in a dispersed manner by use of the polygon mirror 91, the laser beam LB can be applied to the wafer 10 while avoiding the air bubbles B generated due to the ablation, so that favorable ablation can be carried out continuedly. Further, according to the present embodiment, even when debris is generated due to ablation, the debris released into the liquid W is swiftly removed from the liquid chamber 41, since the flow velocity is generated in the liquid W on the upper surface of the wafer 10. Since the debris released into the liquid W is trapped by the filter 46, the debris is prevented from being again circulated into the liquid chamber 41.

After the ablation described above is carried out for the predetermined division line, the holding table 34 on the holding base 31 is moved in the Y-axis direction, or the direction indicated by an arrow D in FIG. 1, by the holding table moving means 24, the X-axis direction moving mechanism 76 of the laser beam applying unit 6 is operated to position the condenser 86 at one end portion of an unprocessed division line adjacent to the just-processed division line, and the same laser processing as the above-mentioned ablation is conducted. After the ablation is performed for all the adjacent division lines, the holding table 34 is rotated by 90 degrees, and the same ablation is also performed for the unprocessed division lines orthogonal to the precedingly processed division lines. In this way, ablation can be carried out for all the division lines on the wafer 10.

As mentioned above, the closed space 41*b* is formed by the liquid chamber 41 on the holding table 34, and at least the upper side of the holding table 34 is covered by the transparent plate 42. The liquid W is supplied in the space 41*b*, and the laser beam is applied through the transparent plate 42, the rotating roller 52, and the liquid W, to perform laser processing. As a result, the air bubbles B generated in the liquid W in the vicinity of the front surface of the wafer 10, the debris generated due to laser processing and released into the liquid W, and the like are swiftly removed, so that they are prevented from obstructing the laser processing. In addition, adhesion of the debris to devices after processing and the like troubles are prevented, whereby processing quality is prevented from being lowered.

In the above embodiment, the wafer 10 as the workpiece is placed on the holding table 34 configured to be movable in the Y-axis direction on the base 21, the condenser 86 of the laser beam applying unit 6 disposed on the lower surface of the horizontal wall section 222 is moved in the X-axis direction to thereby perform desired laser processing, and the position of application of the laser beam LB to the wafer 10 is moved in an indexing feeding direction, or the Y-axis direction, by moving the holding base 31 disposed on the holding table 34 along the guide rails 23 and 23. However, the present invention is not limited to this. A method may be adopted in which the holding base 31 is disposed fixedly on the base 21, and the liquid supply mechanism 40 and the condenser 86 are moved together in the Y-axis direction, and in such a manner, the liquid supply mechanism 40 and the condenser 86 are moved in the indexing feeding direction relative to the wafer 10, to thereby perform the laser processing. In that case, a configuration may be adopted in which a pair of guide rails extending in the Y-axis direction is disposed on the base table 32 disposed on the holding base 31, guided grooves are formed in the lower surface or side surfaces of the liquid chamber 41 of the liquid supply mechanism 40, and moving means (a pulse motor, a male screw rod, and the like) moving the liquid supply mechanism 40 is disposed, to thereby move the liquid supply mechanism 40.

In addition, while the transparent plate 42 and the roller 52 have been formed from glass in the above embodiment, this is not limitative. Any transparent plate through which the laser beam LB is transmitted may be used; for example, these components may be formed of a resin member such as an acrylic resin member.

While an example in which the laser beam LB applied from the laser oscillator 82 is led to the condensing lens 86*b* while being dispersed by the polygon mirror 91 has been illustrated in the above embodiment, this configuration is not restrictive. A reflection mirror disposed fixedly may be used in place of the polygon mirror 91. Further, while an example in which the laser processing applied to the wafer 10 is ablation has been illustrated in the above embodiment, the laser processing may be a processing of forming modified layers inside a workpiece (for example, the laser processing described in Japanese Patent No. 3408805) or a processing of forming so-called shield tunnels (for example, the laser processing described in Japanese Patent Laid-open No. 2014-221483).

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A laser processing apparatus comprising:
   a holding unit having a holding table holding a plate-shaped workpiece;
   a laser beam applying unit applying a laser beam to the workpiece held on the holding table to process the workpiece; and
   a liquid supply mechanism disposed at an upper portion of the holding unit,
   wherein the liquid supply mechanism includes
      a liquid chamber having a transparent plate positioned to form a gap between itself and an upper surface of the workpiece held on the holding table,
      a roller formed of a transparent member that is disposed at a position proximate to, and in a non-contact state with, the upper surface of the workpiece held on the holding table inside the liquid chamber to define a gap between the roller and the upper surface of the workpiece to enable a free flow of a liquid on the workpiece through the gap,
      a roller rotating mechanism rotating the roller,
      a liquid supply nozzle supplying the liquid into the gap from one side of the liquid chamber, and
      a liquid discharge nozzle discharging the liquid from another side of the liquid chamber, and
   the laser beam applying unit includes a laser oscillator emitting the laser beam, and a condenser condensing the laser beam emitted from the laser oscillator to apply the laser beam to the workpiece held on the holding table through the transparent plate, the roller, and the liquid supplied into the gap.

2. The laser processing apparatus according to claim 1, wherein the laser beam applying unit further includes dispersing means dispersing the laser beam emitted from the laser oscillator.

3. The laser processing apparatus according to claim 1, wherein the roller is a rod-shaped member.

4. The laser processing apparatus according to claim 3, wherein the laser beam is applied along a longitudinal length of the roller.

5. The laser processing apparatus according to claim 3, wherein the rod-shaped member is approximately 5.0 mm in diameter.

6. The laser processing apparatus according to claim 1, wherein the roller is disposed in the gap between the transparent plate and the upper surface of the workpiece.

7. The laser processing apparatus according to claim 1, wherein a distance from the upper surface of the wafer to a lower surface of the roller is approximately 0.5 to 2.0 mm.

\* \* \* \* \*